United States Patent [19]
Kitai et al.

[11] Patent Number: 5,042,019
[45] Date of Patent: Aug. 20, 1991

[54] METHOD OF AND APPARATUS FOR SEEKING A DESIRED TRACK BY COUNTING TRACK CROSSING SIGNALS WHICH ARE DETECTED WITHIN A PREDETERMINED TIME INTERVAL

[75] Inventors: Hiroto Kitai, Tokyo; Keiji Tsuchiya, Yokohama, both of Japan

[73] Assignee: Canon Kabushiki Kaisha, Tokyo, Japan

[21] Appl. No.: 545,132

[22] Filed: Jun. 27, 1990

Related U.S. Application Data

[63] Continuation of Ser. No. 224,759, Jul. 27, 1988, abandoned.

[30] Foreign Application Priority Data

Aug. 7, 1987 [JP] Japan .................. 62-196230

[51] Int. Cl.$^5$ .............................. G11B 21/10
[52] U.S. Cl. ........................ 369/32; 369/44; 360/78.04
[58] Field of Search ............. 369/32, 33, 44.28, 44.11; 358/907; 360/72.1, 72.2, 77.01, 77.02, 78.01, 78.04; 235/454

[56] References Cited

U.S. PATENT DOCUMENTS 4,390,912  6/1983  Hertrich et al. .......... 360/78.07 X
4,562,562  12/1985  Moriya et al. ............ 369/44 X
4,700,056  10/1987  Silvy et al. .............. 369/45 X Primary Examiner—Robert L. Richardson
Attorney, Agent, or Firm—Fitzpatrick, Cella, Harper & Scinto

[57] ABSTRACT

Disclosed is a method of seeking a desired track by scanning a recording medium having a plurality of tracks formed thereon by a light spot in a direction across the tracks, and counting track crossing signals detected from the reflected light or the transmitted light of the spot. In this method, of the track crossing signals, only those signals which are detected within a predetermined time inteval are counted as a correct track crossing signal. An apparatus for carrying out such a method is also disclosed.

6 Claims, 5 Drawing Sheets

METHOD OF AND APPARATUS FOR SEEKING A DESIRED TRACK BY COUNTING TRACK CROSSING SIGNALS WHICH ARE DETECTED WITHIN A PREDETERMINED TIME INTERVAL

This application is a continuation of application Ser. No. 07/224,759 filed July 27, 1988, now abandoned.

BACKGROUND OF THE INVENTION

1. Field of the Invention

This invention relates to a method of and an apparatus for seeking a desired track in an optical information recording and/or reproducing apparatus.

2. Related Background Art

Various types of media using light to record information thereon and read out the recorded information, there are known, such as a disc-like form, a card-like form and a tape-like form. These optical information recording mediums include ones capable of recording and reproduction and ones capable of only reproduction.

Recording of information on a medium capable of recording is accomplished by scanning information tracks by a light beam modulated in accordance with record information and reduced to a minute spot-like shape, and information is recorded as an optically detectable information bit row.

Also, reproduction of information from a recording medium is accomplished by scanning the information bit row of information tracks by a light beam spot of such predetermined power that recording is not effected on the medium, and detecting the light reflected from or transmitted through the medium.

In an apparatus for information recording on the recording medium as described above and information reproduction from the recording medium, a so-called optical head is used for the application of a light beam spot to the recording medium and the detection of light reflected from or transmitted through the medium. This optical head is movable relative to the recording medium in the direction of the information tracks thereof and in a direction across said direction, and the information track scanning of the light beam spot is accomplished by such relative movement. Also, in the optical head, a portion of the optical system, for example, an objective lens, is independently held for movement relative to the optical head body in the direction of the optic axis thereof (the focussing direction) and in a direction orthogonal to both the direction of the optic axis and the direction of the information tracks of the recording medium (the tracking direction). The holding of the objective lens is generally done through a resilient member, and the movement of the objective lens in said two directions is usually effected by an actuator utilizing an electromagnetic interaction.

Of the optical information recording mediums as described above, a card-like optical information recording medium (hereinafter referred to as the "optical card") has a great estimated demand as an information recording medium of relatively large capacity, which is compact and light in weight and convenient to carry.

FIG. 1 of the accompanying drawings is a schematic plan view of a postscript type optical card, and FIG. 2 of the accompanying drawings is a fragmentary enlarged view thereof.

Referring to FIG. 1, a number of parallel information tracks 4 extending in a direction indicated by arrows L and F are arranged on the information recording surface of the optical card 1. A home position 3, which provides a the reference position for access to the information tracks 4, is also provided on the information recording surface of the optical card 1. The information tracks 4 are arranged in the order of 4-1, 4-2, 4-3, ... in succession from the home position 3.

As shown in FIG. 2, tracking tracks (e.g. 5-1, 5-2, 5-3) are provided adjacent to the information tracks 4 (e.g. 4-1, 4-2, 4-3). The tracking tracks are utilized as a guide for auto tracking (AT) in which a light beam spot is controlled so as not to deviate from a predetermined information track during the scanning of the light beam spot during information recording and reproduction.

As shown in FIG. 2, G marks 7-1, 7-2 and patterns for discrimination 8-1, 8-2 are pre-recorded on the information tracks 4-2 and 4-3, respectively. The G marks are indicative that these information tracks are fiducial tracks, and the patterns for discrimination are indicative of information regarding the optical card and the information tracks. A suitable number of such fiducial tracks may be provided. The G marks and the patterns for discrimination are formed by preformat, like the tracking tracks, or formed by recording using a light beam spot.

During the recording or reproduction of information, the light beam spot first lies at the home position 3, and is then accessed from this position to a desired information track in the direction of arrow D.

The preformat of such an optical card is described in detail in copending U.S. Patent application Ser. No. 07/036,557.

In order to cause a light beam spot to scan without deviating from a desired information track when the information track is scanned by the light beam spot during the recording or reproduction of information, auto tracking (AT) servo is executed. This AT servo is accomplished by detecting the deviation of the light beam spot from the information track (the AT error) in the optical head, negatively feeding back the detection signal to the tracking actuator, moving the objective lens relative to the optical head body in the tracking direction and causing the light beam spot to follow a desired information track.

Also, in order to make a light beam into a spot of proper size (i.e., to focus the light beam) on the optical card surface when the information track is scanned by the light beam spot during the recording or reproduction of information, auto focusing (AF) servo is executed. This AF servo is accomplished by detecting the deviation of the light beam spot from its focused state (the AF error) in the optical head, negatively feeding back the detection signal to the focusing actuator, moving the objective lens relative to the optical head body in the focusing direction and focusing the light beam spot onto the optical card surface.

The operation of accessing the light beam spot to a desired track is accomplished in the following manner.

First, the light beam spot S lies at the home position 3, where the AT servo draw-in is effected. Thereafter, the light beam spot is moved in the direction of arrow D by driving the optical head. Each time the light beam spot crosses a tracking track, a track crossing detection signal appears from a photodetector in the optical head. FIG. 3 of the accompanying drawings shows the track crossing detection signals. That is, when the light beam spot crosses the tracking tracks 5-1, 5-2, 5-3, 5 4, signals T1, T2, T3, T4 appear. At a point of time whereat a desired number has been counted by counting these signals, the AT servo draw-in is effected and servo draw-in to a desired fiducial track is effected. Further, when access is made from the desired fiducial track to a desired track proximate thereto, the kick operation of moving the objective lens relative to the optical head body in the tracking direction is performed.

Such a track searching method is disclosed, for example, in U.S. Pat. No. 4,106,058 or U.S. Pat. No. 4,285,015. Thus, in the prior-art track searching method as described above, when a detection signal similar to the detection of the tracking tracks appears due to a defect of the recording medium, such as dust adhering to the surface of the recording medium or a flaw present on the surface of the recording medium, such a signal is counted as a track crossing detection signal. This has led to the difficulty that the light beam spot accesses to a wrong track and the access to a desired fiducial track cannot be accomplished accurately.

SUMMARY OF THE INVENTION

It is an object of the present invention to solve the above-noted problem peculiar to the prior art and to provide a method and an apparatus which can accurately find a desired track without being affected by dust, flaws or the like on the surface of a medium.

This object of the present invention is achieved by a method of and an apparatus for seeking a desired track by scanning a recording medium having a plurality of tracks formed thereon by a light spot in a direction across the tracks, and counting track crossing signals detected from the reflected light or the transmitted light of the spot, wherein of said signals, only the signal in which the time interval at which they are detected is within a predetermined range is counted as a correct track crossing signal.

DESCRIPTION OF THE PREFERRED EMBODIMENTS

The present invention will hereinafter be described in detail with respect to an optical card recording-reproducing apparatus with reference to the drawings.

Figure 4:
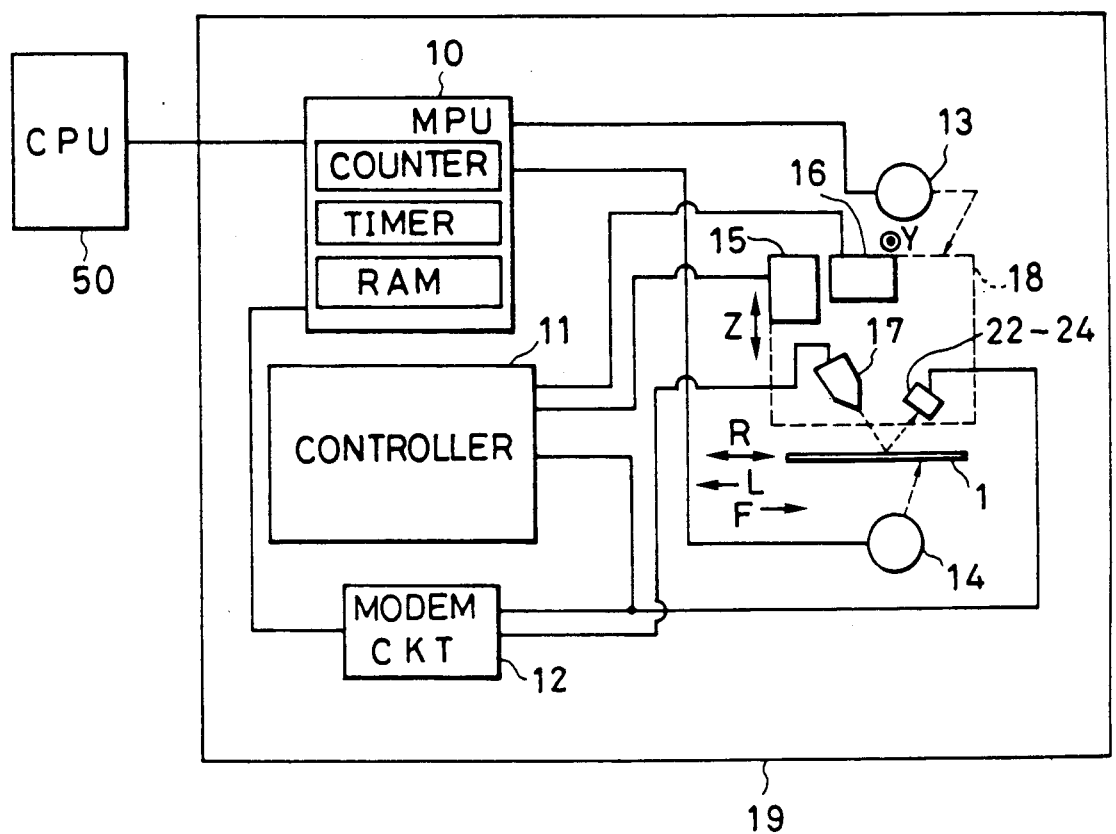
FIG. 4 is a schematic diagram showing an example of the construction of an optical card recording reproducing apparatus to which the present invention is applied.

FIG. 4 is a schematic construction diagram showing an embodiment of an optical card recording-reproducing apparatus to which the present invention is applied.

In FIG. 4, reference numeral 19 designates the recording-reproducing apparatus to which is connected a central processing unit (CPU) 50 which is a high rank control device. In the recording-reproducing apparatus 19, reference numeral 14 denotes a drive motor for introducing an optical card 1 into the recording-reproducing apparatus by a conveying mechanism, not shown, reciprocally moving the optical card in the directions indicated by double head of arrow R in a predetermined recording-reproducing station, and further discharging the optical card out of the apparatus.

The reference numeral 17 designates a light beam applying optical system including a light source, by which light beam spots are formed on the optical card during information recording and during information reproduction. In the present embodiment, during recording and reproduction, three light beam spots are formed on the optical card. The reference numerals 22-24 denote photodetectors which can receive the reflected lights of the three light beam spots on the optical card 1. The reference numeral 15 designates an AF actuator for driving a portion of the light beam applying optical system 17 to move the focus position of the light beam spots on the optical card surface in the directions indicated by double head arrow Z, i.e., a direction perpendicular to the optical card surface, and to thereby accomplish AF, and the reference numeral 16 denotes an AT actuator for driving a portion of the light beam applying optical system 17 to move the light beam spots on the optical card surface in the Y direction (i.e., a direction orthogonal to both the R direction and Z direction) and thereby accomplish AT.

An optical head 18 is constructed including the light beam applying optical system 17, the photodetectors 22-24, the AF actuator 15 and the AT actuator 16. The reference numeral 13 designates a drive motor for moving the optical head in the Y direction to access the light beam spots to a desired track on the optical card.

The drive motor 13 and the drive motor 14 are controlled by a micro processing unit (MPU) 10. This MPU 10 contains therein a random access memory (RAM) for storing therein the number of tracks to a desired track commanded from the CPU 50 during track access, a counter for counting track crossing signals output from a control circuit 11, and a timer for measuring the time interval at which these track crossing signals are detected. Also, the outputs of the photodetectors 22-24 are input to the control circuit 11, and on the basis thereof, the control circuit 11 controls the AF actuator 15 and the AT actuator 16 to thereby accomplish AF and AT. The outputs of the photodetectors 22-24 are also input to a demodulating circuit 12, whereby demodulation of the read information is effected, and the demodulated signal is supplied to the MPU 10. Also, the demodulating circuit 12 modulates the information signal supplied thereto from the MPU 10, and drives the light beam applying optical system 17 in accordance with the modulated signal to thereby accomplish information recording.

The MPU 10 is controlled by the CPU 50 and effects the exchange of data with the CPU.

Figure 6:
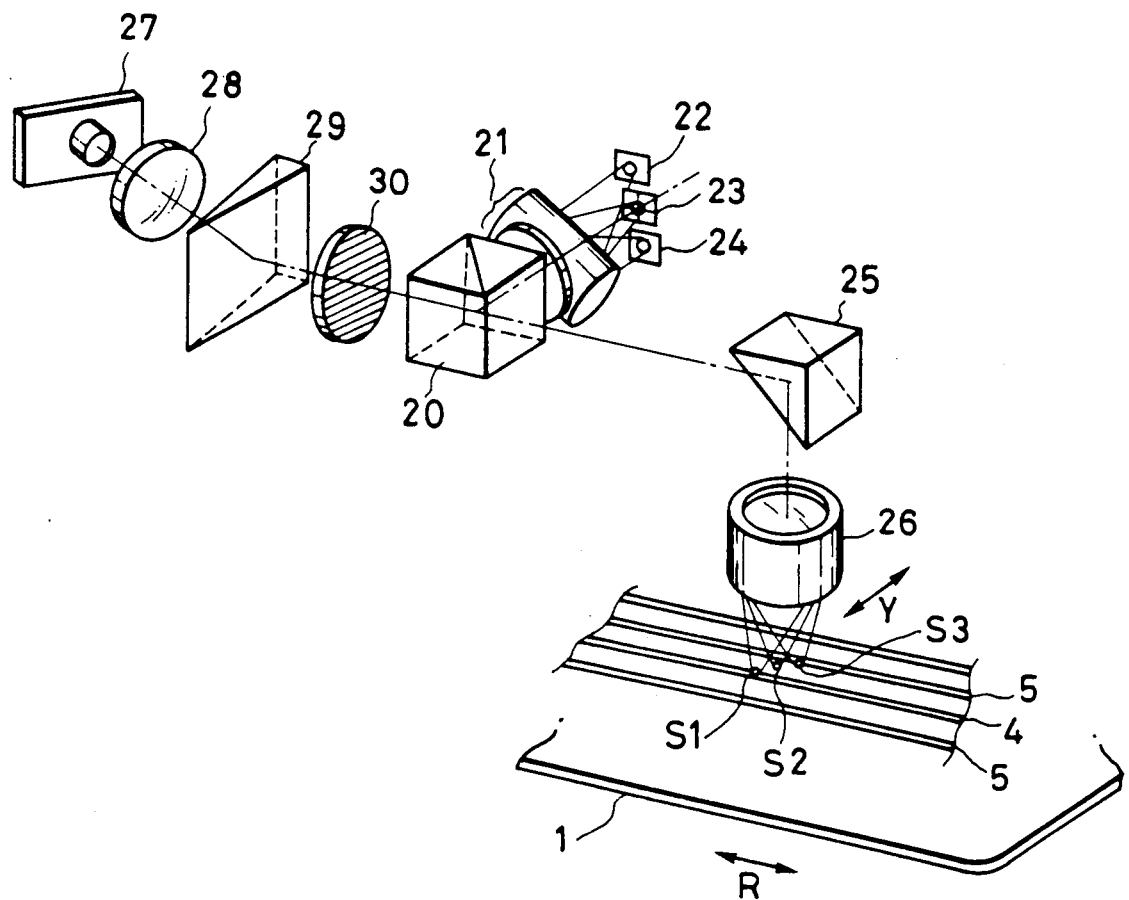
FIG. 6 is a perspective view showing the construction of an optical head portion in the apparatus shown in FIG. 4.

FIG. 6 is a perspective view showing the details of the optical head portion of FIG. 4.

In FIG. 6, reference numeral 27 designates a semiconductor laser which is a light source, reference numeral 28 denotes a collimator lens, reference numeral 29 designates a light beam shaping prism, reference numeral 30 denotes a diffraction grating for dividing the light beam, reference numeral 20 designates a beam splitter, reference numeral 25 denotes a reflecting prism, reference numeral 26 designates an objective lens, reference numeral 21 denotes an astigmatism condensing lens system, and the reference numerals 22-24 designate the photodetectors.

A light beam emitted from the semiconductor laser 27 enters the collimator lens 28 as a divergent light beam and is made into a parallel light beam by this lens. The parallel light beam is shaped into a predetermined light intensity distribution by the light beam shaping prism, and then enters the diffraction grating 30, by which it is divided into three effective light beams (0-order diffracted light and ±1st-order diffracted lights). These three light beams then enter the beam splitter 20 and are rectilinearly transmitted therethrough, and are further reflected by the reflecting prism 25 and enter the objective lens 26, and pass therethrough and are converged thereby to form three minute beam spots S1 (corresponding to ±1st-order diffracted light), S2 (corresponding to 0-order diffracted light) and S3 (corresponding to −1-st-order diffracted light) on the optical card 1.

Figure 5:
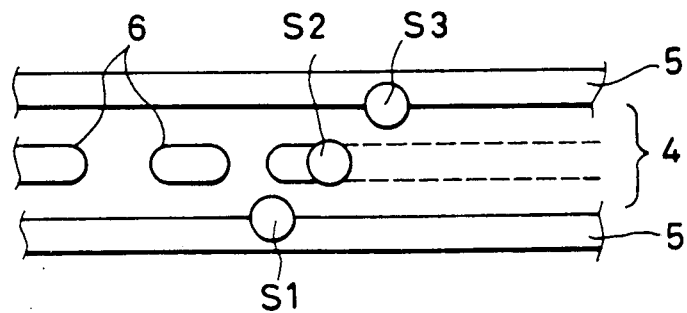
FIG. 5 is a schematic plan view illustrating the manner in which information is recorded on the optical card.

FIG. 5 shows the positions of the light beam spots on the optical card.

The light beam spots S1 and S3 lie on adjacent tracking tracks 5, and the light beam spot S2 lies on the information track 4 between said tracking tracks. The reference numeral 6 designates information bits recorded by the light beam spots.

Thus, the reflected lights from the light beam spots formed on the optical card pass through the objective lens 26 and are made substantially parallel thereby, and are reflected by the reflecting prism 25 and are further reflected by the beam splitter 20 and are converged by the condensing lens system 21, and enter the photodetectors 22, 23 and 24.

Figure 7:
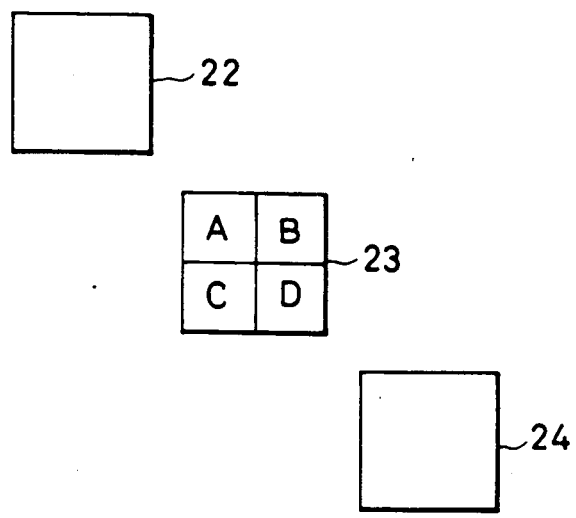
FIG. 7 shows the construction of photodetectors in the optical head shown in FIG. 6.

FIG. 7 shows the construction of the photodetectors 22, 23 and 24. The photodetector 23 is a four-division photodetector.

The basic construction of such an optical head is disclosed in copending U.S. Patent application Ser. No. 07/479,205.

Figure 8:
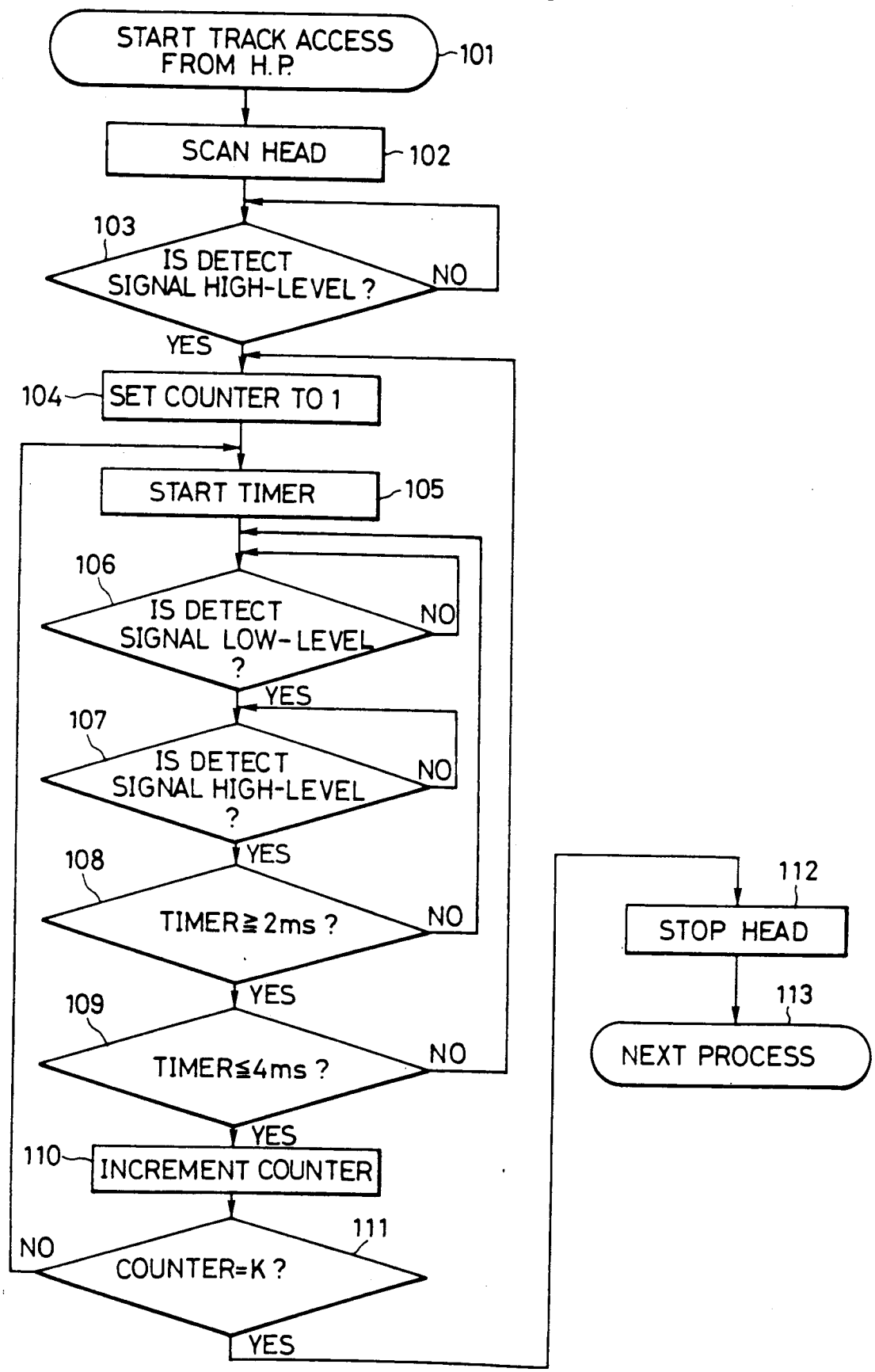
FIG. 8 is a flow chart showing the process of the track searching method of the present invention.
Figure 9:
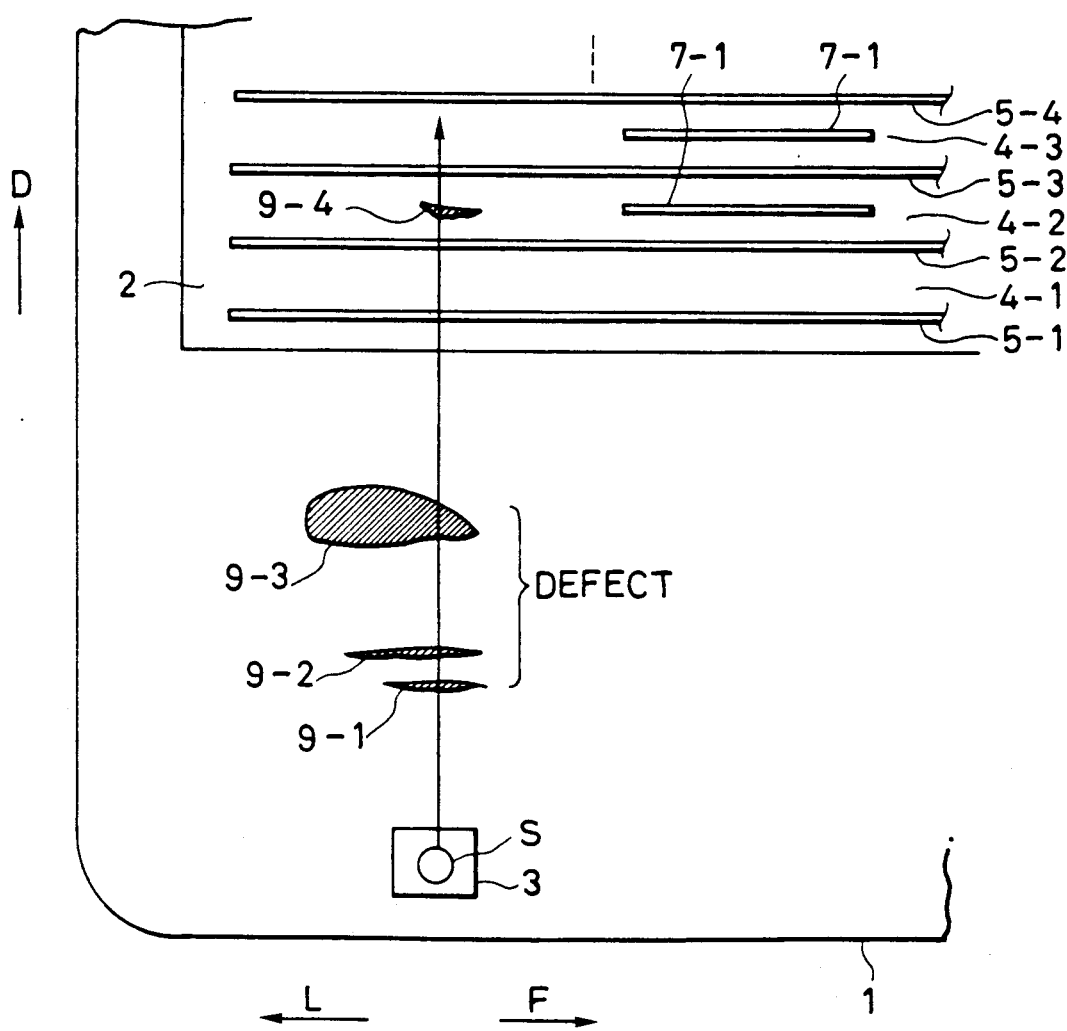
FIG. 9 is a schematic plan view of the optical card for illustrating the track searching method of the present invention.
Figure 10:
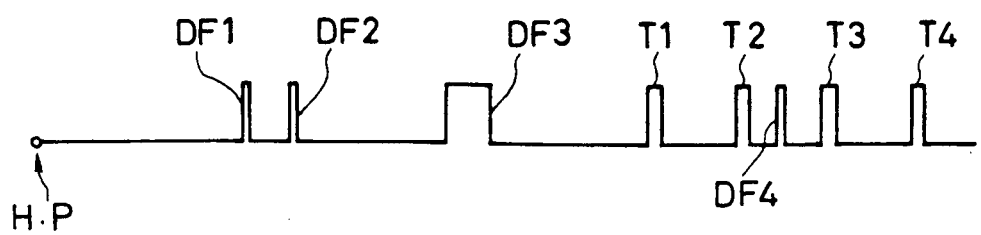
FIG. 10 shows the wave forms of signals detected from the optical card of FIG. 9.

FIG. 8 is a flow chart showing an embodiment of the tracking access method according to the present invention, FIG. 9 shows the movement route of the light beam spot on the optical card at that time, and FIG. 10 shows the track crossing detection signals at that time.

Figure 1:
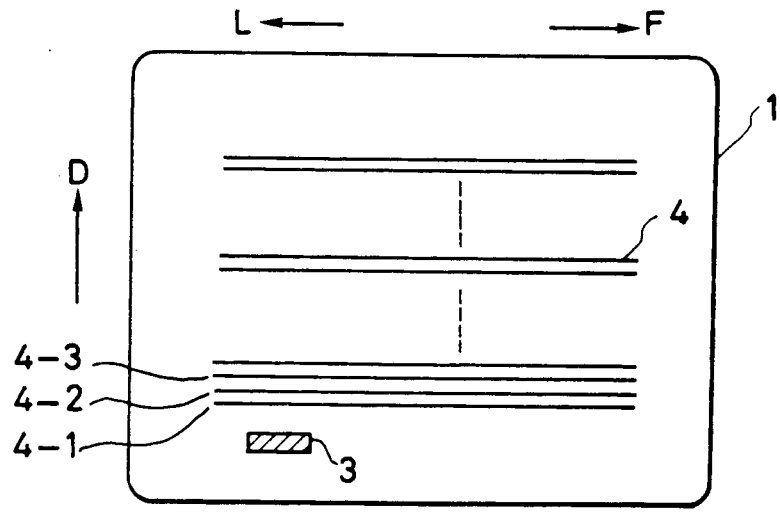
FIG. 1 is a schematic plan view showing an example of an optical card.
Figure 2:
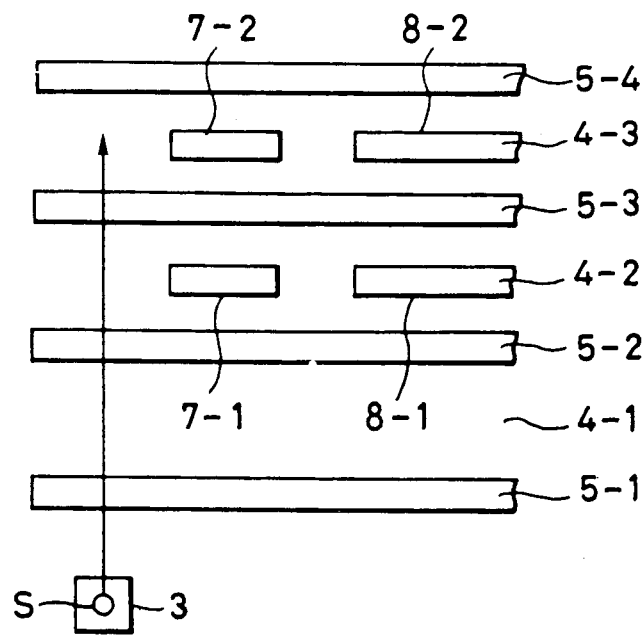
FIG. 2 is a fragmentary enlarged view of the optical card shown in FIG. 1.
Figure 3:
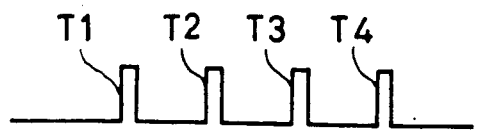
FIG. 3 shows the wave forms of track crossing signals in the track searching method according to the prior art.

In FIG. 9, reference numeral 1 designates the optical card and reference numeral 2 denotes a recording area. In this recording area, as in FIGS. 1 and 2, a plurality of tracking tracks 5 (e.g. 5 1, 5-2, 5-3, 5-4) extending in the direction LF and a plurality of information tracks (e.g., 4-1, 4 2, 4 3) are alternately formed. The reference numerals 7-1 and 7-2 designate G marks formed in the information tracks 4-2 and 4-3. The tracking tracks and the G marks are portions of low reflectance. A home position 3 is formed outside of the recording area 2. Let it be assumed that defects 9-1, 9-2, 9-3 and 9 4 are present on the optical card 1. These defects are flaws, dust or the like, and are portions of low reflectance.

Operation of the present embodiment will hereinafter be described with reference to FIGS. 9 and 10 and in accordance with the flowchart of FIG. 8.

At first, the light beam spot S lies at the home position 3, and from this state, track access is started (step 101). The light beam spot S is moved in a direction D at a predetermined speed (e.g., 350 tracks/sec.) by an access command (step 102). This movement is accomplished on the basis of the movement of the optical head 18 by the driving of the drive motor 13 of FIG. 4.

When, with the movement of the light beam spot, the beam spot crosses the defects 9-1, 9-2, 9 3 and 9-4 and the tracking tracks 5-1, 5-2, 5-3 and 5-4, crossing detection signal pulses DF1, DF2, DF3 and DF4 and crossing detection signal pulses T1, T2, T3 and T4 are obtained from the photodetectors in the optical head, as shown in FIG. 10. In this manner, the detection signals are output as pulses of H level.

With the tracking tracks are arranged regularly, and the speed of movement of the light beam spot constant, the detection signal pulses appear at a predetermined time interval In contrast, the arrangement of the defects is irregular, and the probability that the defects are actually present at intervals equal to the tracking track arrangement pitch is very small. So, a predetermined range is defined with the time obtained by dividing the length between the tracks by the speed of movement of the spot as the central value, and only the signals in which the detected time interval is within this range are counted, whereby accurate track access becomes possible. For example, assuming that, as described above, the light beam spot moves in the direction D at a speed of 350 tracks/sec., the time required for the light beam spot to move over one track pitch is 2.9 m/sec. Actually, the speed of movement of the light beam spot fluctuates to a certain degree. Therefore, with the error caused by such fluctuation being taken into account, when the track crossing detection signal pulses are at a time interval within the range of 2-4 m/sec. and regarded as indicative of regular track crossing, when said track crossing detection signal pulses are outside said range, it is deemed that one of the signal pulses is not a regular signal. The probability with which the defects are arranged outside this range is sufficiently greater than the probability that the defects are arranged within this range. Therefore, by this, right track crossing signals can be distinguished.

Turning back to FIG. 8, subsequent to step 102, with the movement of the light beam spot, a detection signal pulse DF1 is obtained from the defect 9-1. At a point of time whereat there has occurrs a the rising of this pulse, the contained counter is set to 1 (steps 103 and 104). At the same time, a timer for counting the detection signal pulse is started (step 105). Subsequently, after the detection signal falls (step 106), a detection signal pulse DF2 based on the next defect 9-2 is obtained, and at a point of time whereat there has occurred a rising of this pulse (step 107), whether the said timer is 2 m sec. or more is judged (step 108), and since, in the case of FIGS. 9 and 10, the timer is less than 2 m sec., return is made to the step 106. Subsequently, a detection signal DF3 based on the defect 9-3 is obtained, and at a point of time whereat there has occurred a rising of this pulse (step 107), whether the timer is 2 m sec. or more is judged (step 108), and since, in the case of FIGS. 9 and 10, the timer is 2 m sec. or more, whether the timer is 4 m sec. or less is subsequently judged (step 109). Since, in the case of FIGS. 9 and 10, the timer exceeds 4 m sec., return is made to step 104. Here the counter is again set to 1. That is, it is judged that the signal pulses DF1 and DF2 of FIG. 10, based on the defects 9-1 and 9-2 of FIG. 9, are not signal pulses based on regular track crossing.

Subsequently, at a point of time whereat there has occurred a rising of the detection signal pulse T1 of the tracking track 5-1 at step 107 via steps 105 and 106, step 108 is executed, and since, in the case of FIGS. 9 and 10, the timer is 2 m sec. or more, step 109 is subsequently executed, and since, in the case of FIGS. 9 and 10, the timer exceeds 4 m sec., return is made to the step 104. Here the counter is again set to 1. That is, it is judged that the signal pulse DF3 of FIG. 10, based on the defect 9 3 of FIG. 9, is not a signal pulse based on regular track crossing.

Subsequently, at a point of time whereat there has occurred a rising of the detection signal pulse T2 of the tracking track 5-2 at step 107 via steps 105 and 106, step 108 is executed, and since, in the case of FIGS. 9 and 10, the timer is 2 m sec. or in the case of FIGS. 9 and 10, the timer is 4 m sec. or less, the counter is incremented to 2 (step 110), whereafter whether this counter has assumed a desired value K is judged (step 111), and in the case of the present embodiment, the counter is now less than the desired value K, and therefore return is made to the step 105. That is, it is judged that the signal pulse T1 of FIG. 10 based on the tracking track 5-1 of FIG. 9 is a signal pulse based on regular track crossing, and this signal pulse is counted.

Subsequently, at a point of time whereat there has occurred a rising of the detection signal pulse DF4 of the defect 9-4 at step 107 via step 106, step 108 is executed, and since in the case of FIGS. 9 and 10, the timer is less than 2 m sec., return is made to step 106. Subsequently, at a point of time whereat there has occurred a rising of the detection signal pulse T2 based on the tracking track 5-2 at step 107, whether the timer is 2 m sec. or more at step 108 is judged, and since, in the case of FIGS. 9 and 10, the timer is 2 m sec. or more, whether the timer is 4 m sec. or less is judged at step 109. Since, in the case of FIGS. 9 and 10, the timer is 4 m sec. or less, the counter is then incremented to 3 (step 110), whereafter, whether the counter has assumed the desired value K is judged (step 111), and in the case of the present embodiment, the counter is now less than desired value K and therefore, return is made to the step 105. That is, it is judged that the signal pulse DF4 of FIG. 10, based on the defect 9-4 of FIG. 9, is not a signal pulse based on regular track crossing, and it is judged that the signal pulse T2 of FIG. 10 based on the tracking track 5-2, is a signal pulse based on regular track crossing, and this latter signal pulse is counted.

In the manner described above, the operation is repeated until at step 111, the counter assumes the desired value K stored in the RAM of FIG. 4, and immediately after the counter has assumed the desired value K, the movement of the optical head is stopped (step 112), and shift is made to the next process (for example, AT draw-in) (step 113).

Of the above-described steps, steps 103–111 are executed in the MPU 10 and the control circuit 11 in FIG. 4.

Thus, after the access to the desired reference track has been terminated by movement of the optical head, the light beam spot is moved in the reference track in the direction indicated by arrows L and F and the G mark and the $ pattern for discrimination are read, whereby confirmation of the reference track is effected. Then a kick operation is performed to access the information to a track to be recorded or reproduced, whereby information recording on that track or information reproduction from said track is effected. During the kick operation, little or no track movement error occurs and therefore, the light beam spot can be accurately moved to the desired track.

The present invention permits various applications besides the above-described embodiment. For example, in the above-described embodiment, the speed of movement of the optical head in the tracking direction is constant, but this speed of movement may be varied. That is, the MPU 10 which controls any variation in the speed of movement can calculate the track crossing time and therefore, by suitably varying the set time interval on the basis of the scanning speed, an effect similar to that of the above-described embodiment can be obtained.

Further, in the above-described embodiment, the present invention is carried out by the use of the software provided by the MPU 10, but it is also possible to carry out the present invention by the use of other hardware which will obtain a similar effect.

Also, the above-described embodiment has been shown with respect to a case wherein the information recording medium is an optical card, but in the present invention, the recording medium may be of a tape-like shape, a disc-like shape or any other suitable shape. In the case of a disc-like medium, the tracks are usually formed concentrically or spirally. Also, when the medium is of the transmission type (the type in which information is reproduced by a transmitted light), track crossing signals are detected from the light transmitted through the medium. The present invention covers all these applications without departing from the scope thereof as defined in the appended claims.

What is claimed is:

1. A track seeking method for use with an optical information recording/reproducing apparatus in which information is recorded and/or reproduced by irradiating a light spot onto a recording medium having a plurality of tracks extending in a predetermined direction, said method comprising the steps of:

moving the light spot relative to the recording medium in a direction substantially perpendicular to the predetermined direction of the tracks to irradiate the recording medium with the light spot;

detecting one of reflected and transmitted light from the recording medium produced by moving the light spot relative to the recording medium in said moving step to generate a detection signal;

generating pulse signals on the basis of the detection signal generated in said detecting step;

discriminating the pulse signals generated in said generating step for comparing a pulse interval with a range of a predetermined interval;

counting the number of tracks crossed by the light spot by counting the pulse signals discriminated in said discriminating step when the pulse interval is within the range of the predetermined interval; and seeking a desired track on the recording medium based on the pulse signals counted in said counting step.

2. A method according to claim 1, further comprising a step of determining a central value of the range of the predetermined interval by dividing the pitch between the tracks by the scanning speed of the light spot.

3. A method according to claim 1, wherein the light beam is moved in said moving step, relative to a recording medium comprising a card-like recording medium having a plurality of parallel tracks formed thereon.

4. A track seeking apparatus for use with an optical information recording/reproducing device in which information is recorded and/or reproduced by irradiating a light spot onto a recording medium having a plurality of tracks extending in a predetermined direction, said apparatus comprising:

moving means for moving the light spot relative to the recording medium in a direction substantially perpendicular to the predetermined direction and for irradiating the recording medium with the light spot;

detecting means for detecting one of reflected and transmitted light from the recording medium produced by moving the light spot relative to the recording medium by said moving means and for generating a detection signal; and control means for seeking a desired track on the recording medium by counting the number of tracks crossed by the light spot, said control means comprising means for generating pulse signals on the basis of the detection signal generated by said detecting means, means for discriminating the generated pulse signals by comparing a pulse interval with a range of a predetermined interval, and means for counting only the pulse signals discriminated within the predetermined range to count the number of tracks crossed by the light spot.

5. An apparatus according to claim 4 wherein said moving means comprises an optical head for generating the lights pot and a linear motor for moving said optical head in the direction substantially perpendicular to the predetermined direction of the tracks.

6. An apparatus according to claim 4, wherein the control means further comprises means for determining a central value of the range of the predetermined interval by dividing the pitch between the tracks by the scanning speed of the lights pot.

* * * * *

UNITED STATES PATENT AND TRADEMARK OFFICE
CERTIFICATE OF CORRECTION

PATENT NO. : 5,042,019          Page 1 of 2
DATED     : August 20, 1991
INVENTOR(S) : Hiroto Kitai, et al.

It is certified that error appears in the above-identified patent and that said Letters Patent is hereby corrected as shown below:

COLUMN 1

Line 18, "there" should be deleted.

COLUMN 2

Line 67, "5 4" should read --5-4--.

COLUMN 3

Line 18, "to" should be deleted;
Line 19, "the" (2nd occurrence) should be deleted; and
Line 51, "recording reproduc-" should read --recording-reproduc- --.

COLUMN 5

Line 14, "the" should be deleted;
Line 31, "1-st-order" should read --1st-order--;
Line 61, "5 1," should read --5-1,--;
Line 63, "4-1, 4 2, 4 3)" should read --4-1, 4-2, 4-3)--; and
Line 68, "9 4" should read --9-4--.

COLUMN 6

Line 14, "9 3" should read --9-3--;
Line 24, "interval In" should read --interval. In--; and
Line 53, "there has occurrs a the" should read --there occurs a--.

UNITED STATES PATENT AND TRADEMARK OFFICE
CERTIFICATE OF CORRECTION

PATENT NO. : 5,042,019

DATED : August 20, 1991

INVENTOR(S) : Hiroto Kitai, et al.

It is certified that error appears in the above-identified patent and that said Letters Patent is hereby corrected as shown below:

COLUMN 7

Line 16, "9 3" should read --9-3--;
    Line 22, "or in" should read --or more, step 109 is subsequently executed, and since, in--;
    Line 48, "the" should be deleted; and
    Line 52, "FIG. 10" should read --FIG. 10,--.

COLUMN 8

Line 1, "$" should be deleted.

COLUMN 10

Line 14, "lights pot" should read --light spot--; and
    Line 21, "lights pot." should read --light spot.--.

Signed and Sealed this

Fourth Day of May, 1993

Attest:

MICHAEL K. KIRK

*Attesting Officer*    *Acting Commissioner of Patents and Trademarks*